United States Patent
Saint-Marcel

(10) Patent No.: US 10,380,314 B1
(45) Date of Patent: Aug. 13, 2019

(54) SYSTEM AND METHOD FOR ESTIMATING CURRENT IN AN ELECTRONIC CIRCUIT DESIGN

(71) Applicant: Cadence Design Systems, Inc., San Jose, CA (US)

(72) Inventor: Laurent Rene Saint-Marcel, Mouans-Sartoux (FR)

(73) Assignee: Cadence Design Systems, Inc., San Jose, CA (US)

( * ) Notice: Subject to any disclaimer, the term of this patent is extended or adjusted under 35 U.S.C. 154(b) by 57 days.

(21) Appl. No.: 15/591,548

(22) Filed: May 10, 2017

(51) Int. Cl.
*G06F 17/50* (2006.01)

(52) U.S. Cl.
CPC ...... *G06F 17/5081* (2013.01); *G06F 17/5077* (2013.01); *G06F 17/5009* (2013.01); *G06F 17/5022* (2013.01); *G06F 17/5045* (2013.01); *G06F 17/5068* (2013.01)

(58) Field of Classification Search
CPC ............ G06F 17/5009; G06F 17/5045; G06F 17/5068; G06F 17/5077; G06F 17/5081; G06F 17/5022; G06F 19/12
See application file for complete search history.

(56) References Cited

U.S. PATENT DOCUMENTS

| | | | | |
|---|---|---|---|---|
| 7,318,207 B2* | 1/2008 | Takabe | ................ | G06F 17/5022 703/2 |
| 7,353,157 B2* | 4/2008 | Wasynczuk | ......... | G06F 17/5036 703/13 |
| 7,742,908 B2* | 6/2010 | Sarti | .................. | G06F 17/5009 703/14 |
| 8,180,621 B2* | 5/2012 | Phillips | ............... | G06F 17/5031 703/14 |
| 8,402,420 B2* | 3/2013 | Jiang | ................... | G06F 17/5077 716/118 |
| 8,437,988 B2* | 5/2013 | Fang | .................... | G06F 17/5036 703/13 |
| 8,468,482 B1* | 6/2013 | Pack | ................... | G06F 17/5036 716/110 |
| 8,615,725 B1* | 12/2013 | Keller | ................ | G06F 17/5031 716/108 |
| 8,732,630 B1* | 5/2014 | Kolpekwar | .... | G01R 31/318314 716/101 |
| 8,738,335 B1* | 5/2014 | Ho | ...................... | G06F 17/5036 703/14 |
| 8,924,911 B2* | 12/2014 | Colleran | ............ | G06F 17/5036 716/132 |
| 8,966,421 B1* | 2/2015 | Kariat | ................ | G06F 17/5036 716/106 |
| 9,122,837 B1* | 9/2015 | Ho | ...................... | G06F 17/5081 |

(Continued)

*Primary Examiner* — Helen Rossoshek
(74) *Attorney, Agent, or Firm* — Mark H. Whittenberger, Esq.; Holland & Knight LLP

(57) ABSTRACT

The present disclosure relates to a method for use with an electronic design. Embodiments may include receiving, using a processor, the electronic design and identifying a partially routed net associated with the electronic design. Embodiments may further include generating a net graph for the partially routed net and selecting a wire associated with the partially routed net. Embodiments may also include determining a missing current needed to satisfy Kirchhoff's Current Law ("KCL") along a portion of the wire and generating a virtual terminal attached to the selected wire, wherein the virtual terminal is assigned the missing current.

20 Claims, 10 Drawing Sheets

(56) References Cited

U.S. PATENT DOCUMENTS

| | | | | |
|---|---|---|---|---|
| 9,129,079 B1* | 9/2015 | Ho | .................. | G06F 17/5036 |
| 9,330,222 B2* | 5/2016 | White | .................. | G06F 17/5068 |
| 2016/0315548 A1* | 10/2016 | Jasim | .................. | H02M 7/483 |
| 2016/0373236 A1* | 12/2016 | Ha | .................. | H02H 7/00 |

* cited by examiner

SYSTEM AND METHOD FOR ESTIMATING CURRENT IN AN ELECTRONIC CIRCUIT DESIGN

FIELD OF THE INVENTION

The embodiments of the present disclosure relate to a method of electronic circuit design, and more particularly, to a method for estimating current in an electronic circuit design.

BACKGROUND

With electronic designs becoming smaller and smaller it is more and more important to be aware of and able to fix current density and electromigration errors sooner in the design flow. This requires current estimation in each wire of a design. Usually, tools need a fully routed net to be able to extract the current that goes through each wire, however estimating the current in each wire of a partially routed net is a complex problem. On a partially routed net, it is not possible to know what the future connections of a wire may be and how many terminals it will connect with. A future connection might completely change the net topology and the current that goes through a wire. Furthermore, to be able to propagate the current in every wire of a net, a designer needs to have the sum of all terminals current equal to zero in order to satisfy the Kirchhoff's current laws, which is not the case until the net is fully routed and connected to all terminals.

SUMMARY

Accordingly, an embodiment of the present disclosure is directed to a computer-implemented method for use with an electronic design. The method may include receiving, using a processor, the electronic design and identifying a partially routed net associated with the electronic design. The method may further include generating a net graph for the partially routed net and selecting a wire associated with the partially routed net. The method may also include determining a missing current needed to satisfy Kirchhoff's Current Law ("KCL") along a portion of the wire and generating a virtual terminal attached to the selected wire, wherein the virtual terminal is assigned the missing current.

One or more of the following features may be included. In some embodiments, the method may include propagating the missing current in the net graph for one or more fully routed nets associated with the electronic design. The method may also include returning the current of the selected wire and displaying at least one connection point in the electronic design that can accept the missing current. The method may further include comparing a proposed current with a wire width associated with the selected wire and associating, at a graphical user interface, a color with a portion of the electronic design, based upon, at least in part, the comparison. Generating the virtual terminal may be performed automatically. The method may also include allowing a user to manually generate the virtual terminal.

In another embodiment of the present disclosure a computer-readable storage medium having stored thereon instructions, which when executed by a processor result in a number of operations is provided. Operations may include receiving, using a processor, the electronic design and identifying a partially routed net associated with the electronic design. Operations may further include generating a net graph for the partially routed net and selecting a wire associated with the partially routed net. Operations may also include determining a missing current needed to satisfy Kirchhoff's Current Law ("KCL") along a portion of the wire and generating a virtual terminal attached to the selected wire, wherein the virtual terminal is assigned the missing current.

One or more of the following features may be included. In some embodiments, operations may include propagating the missing current in the net graph for one or more fully routed nets associated with the electronic design. Operations may also include returning the current of the selected wire and displaying at least one connection point in the electronic design that can accept the missing current. Operations may further include comparing a proposed current with a wire width associated with the selected wire and associating, at a graphical user interface, a color with a portion of the electronic design, based upon, at least in part, the comparison. Generating the virtual terminal may be performed automatically. Operations may also include allowing a user to manually generate the virtual terminal.

In yet another embodiment of the present disclosure a computing system for use in an electronic circuit design is provided. The system may include at least one processor configured to receive the electronic design and identify a partially routed net associated with the electronic design. The at least one processor may be further configured to generate a net graph for the partially routed net and to select a wire associated with the partially routed net. The at least one processor may be further configured to determine a missing current needed to satisfy Kirchhoff's Current Law ("KCL") along a portion of the wire. The at least one processor may be further configured to generate a virtual terminal attached to the selected wire, wherein the virtual terminal is assigned the missing current.

One or more of the following features may be included. In some embodiments, the at least one processor may be further configured to propagate the missing current in the net graph for one or more fully routed nets associated with the electronic design. The at least one processor may be further configured to return the current of the selected wire. The at least one processor may be further configured to display at least one connection point in the electronic design that can accept the missing current. The at least one processor may be further configured to compare a proposed current with a wire width associated with the selected wire and associate, at a graphical user interface, a color with a portion of the electronic design, based upon, at least in part, the comparison. In some embodiments, generating the virtual terminal may be performed automatically.

It is to be understood that both the foregoing general description and the following detailed description are exemplary and explanatory and are intended to provide further explanation of embodiments of the present disclosure as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

DETAILED DESCRIPTION

Figure 1:
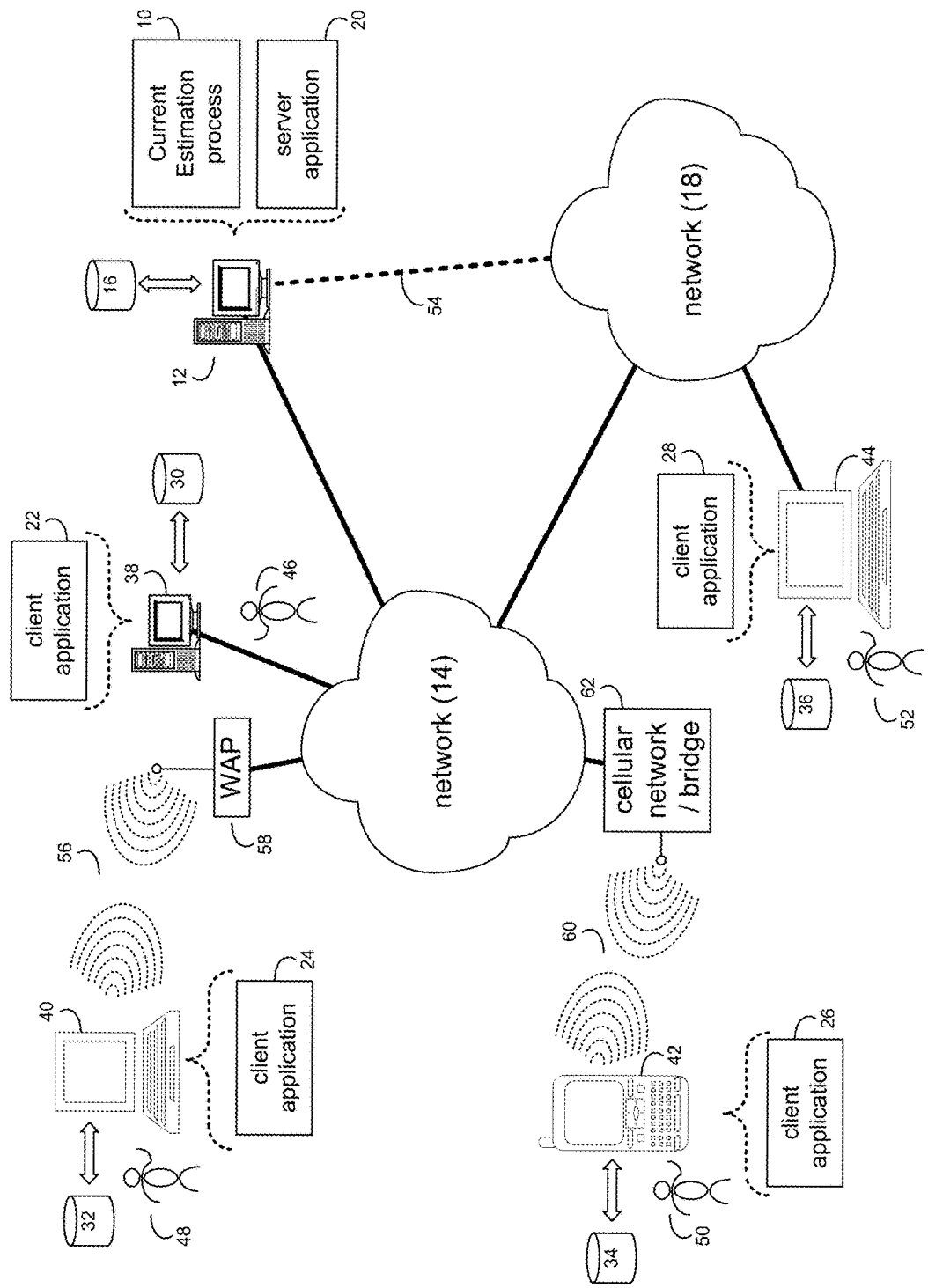
FIG. 1 diagrammatically depicts a current estimation process coupled to a distributed computing network.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings denote like elements.

Referring to FIG. 1, there is shown current estimation process 10 and debugging process 11 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, the current estimation process may reside on a client electronic device, such as a personal computer, notebook computer, personal digital assistant, or the like.

As will be discussed below in greater detail, current estimation process 10 may be used to estimate the current in a wire that is being created manually by creating a virtual terminal. The current of this virtual terminal may correspond to the missing current in the partial routed net graph as such the sum of the terminal's current on the partial net graph is now equal to 0. The virtual terminal may be inserted either at the beginning or the end of the wire which current must be estimated. The location of this virtual terminal is critical to get the best current estimation. Accordingly, embodiments of current estimation process 10 may allow for estimation of the current of a wire during its manual edition, before the net is fully routed.

The instruction sets and subroutines of current estimation process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™ Server and Microsoft Exchange™ Server. Server application 20 may interact with one or more client applications (e.g., client applications 22, 24, 26, 28) in order to execute current estimation process 10. Examples of client applications 22, 24, 26, 28 may include, but are not limited to, design verification tools such as those available from the assignee of the present disclosure. These applications may also be executed by server computer 12. In some embodiments, current estimation process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the current estimation process may be a client-side application (not shown) residing on one or more client electronic devices 38, 40, 42, 44 (e.g., stored on storage devices 30, 32, 34, 36, respectively). As such, the current estimation process may be a stand-alone application that interfaces with a client application (e.g., client applications 22, 24, 26, 28), or may be an applet/application that is executed within a client application. As such, the current estimation process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, current estimation process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE's™, Redhat Linux™, or a custom operating system.

As discussed above, with electronic designs becoming smaller and smaller it is more and more important to be aware of and able to fix current density and electromigration errors sooner in the design flow. This requires current estimation in each wire of a design. Usually, tools need a fully routed net to be able to extract the current that goes through each wire, however estimating the current in each wire of a partially routed net is a complex problem. On a partially routed net, it is not possible to know what the future connections of a wire may be and how many terminals it will connect with. A future connection might completely change the net topology and the current that goes through a wire. Furthermore, to be able to propagate the current in every wire of a net, a designer needs to have the sum of all terminals current equal to zero in order to satisfy the Kirchhoff's current laws, which is not the case until the net is fully routed and connected to all terminals.

Accordingly, embodiments of current estimation process 10 may be configured to estimate the current in a wire of a partially routed net using a virtual terminal. As will be discussed below in greater detail, current estimation process 10 may be used to estimate the current in a wire that is being created manually by creating a virtual terminal. The current of this virtual terminal is the missing current in the partial routed net graph (so the sum of the terminal's current on the partial net graph is now equal to 0). The virtual terminal may be inserted either at the beginning or the end of the wire which current must be estimated. The location of this virtual terminal is critical to get the best current estimation. Accordingly, embodiments of current estimation process 10 may allow for estimation of the current of a wire during its manual edition, before the net is fully routed.

Usually, the current extraction is performed only on a fully routed net. In this way, routers usually plan the entire net topology using wire planning algorithms which are quite slow. They know all of the terminals that will be connected by a wire and the sum of the terminals' current in the entire net graph satisfy the Kirchhoff's current laws. Moreover, checkers that check design rule errors or Electromigration (EM) violations only run on a fully routed net.

For partially routed designs that are routed manually by the user, if the sum of the terminals current is not equal to zero, the engines may decrease the current of the source terminals so that it matches the current of the sink. However, this approach may underestimate the current that can go through a wire which is not the desired behavior when computing the current to get a wire width that will avoid EM violations.

As such, and in order to avoid current density and EM design errors, it may be necessary to estimate the wire width that is deduced from the wire current as soon as possible in the design process to converge more quickly to a valid design. Being able to estimate the wire width (without underestimating it) early in the design flow and during manual wire creation is a strong advantage to create an EM error free design more quickly.

Trying to estimate the current interactively, before the net is completely routed requires precision and it may be better to overestimate the current rather than underestimate it. For example, if the current is overestimated, it may be possible to apply design modifications that will avoid EM violations and design congestion issues. Conventional solutions tend to underestimate the current and the wire width, leading to EM violations and future design congestion issues.

Figure 2:
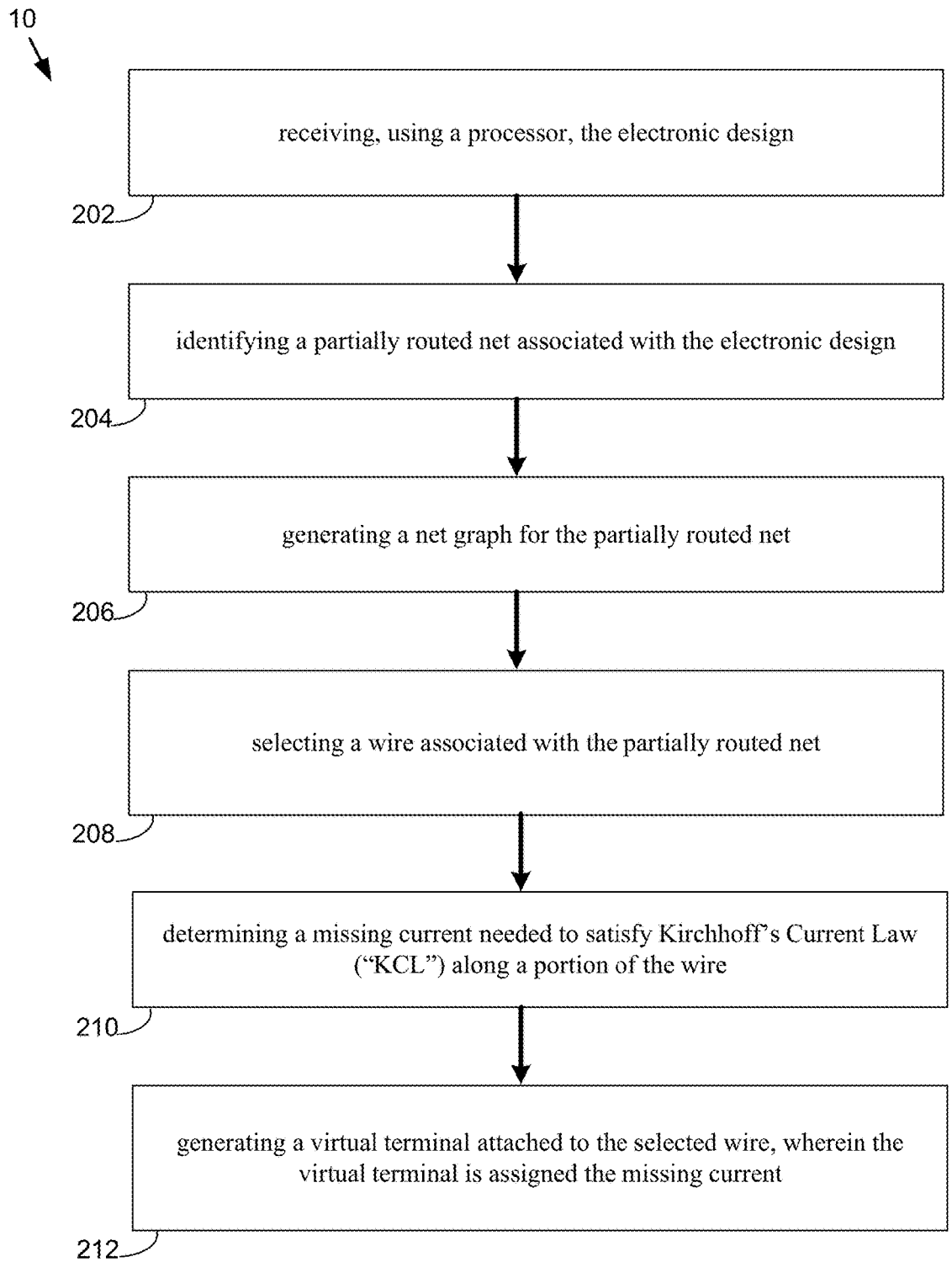
FIG. 2 is an exemplary flowchart of a current estimation process according to an embodiment of the present disclosure.

Referring now to FIG. 2, a flowchart depicting an embodiment consistent with current estimation process 10 is provided. The method may include receiving (202), using a processor, the electronic design and identifying (204) a partially routed net associated with the electronic design. Embodiments may further include generating (206) a net graph for the partially routed net and selecting (208) a wire associated with the partially routed net. Embodiments may also include determining (210) a missing current needed to satisfy Kirchhoff's Current Law ("KCL") along a portion of the wire and generating (212) a virtual terminal attached to the selected wire, wherein the virtual terminal is assigned the missing current. Numerous other operations are also within the scope of the present disclosure as provided in further detail hereinbelow.

Figure 3:
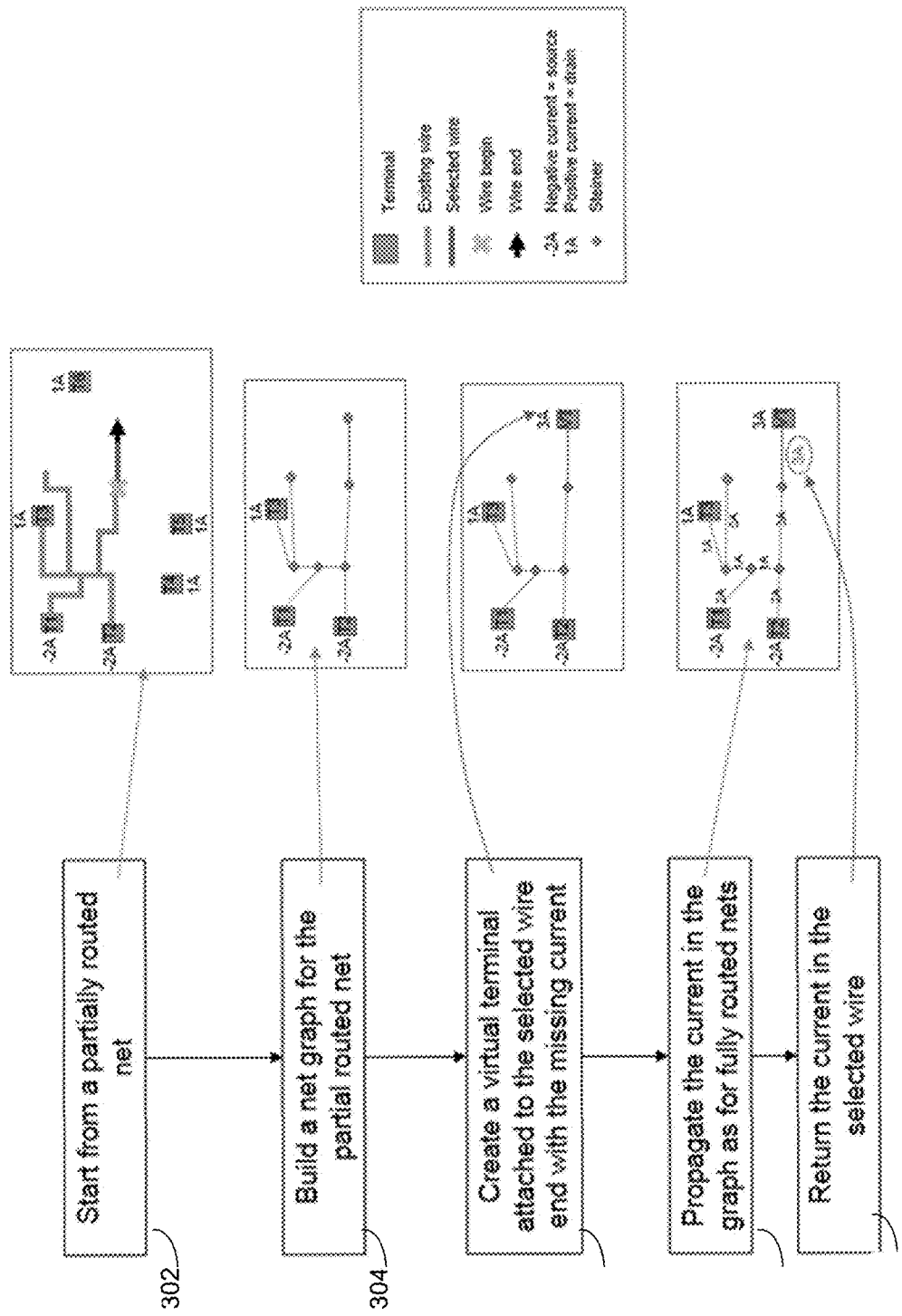
FIG. 3 is an illustration of a schematic of a current estimation process according to an embodiment of the present disclosure.

Referring also to FIG. 3, embodiments of current estimation process 10 may be configured to estimate the current in a wire A of a partially routed net 302. In this way, the process may include building 304 a partial net graph with only terminals and wires physically connected to wire A. The process may further include creating 306 a virtual terminal, and assigning it the missing current of the partial net graph (e.g., virtual terminal current=−sum (all connected terminals current)). The process may also include inserting the virtual terminal in the graph. The location of the terminal may be critical to get the best current estimation. The process may also include propagating 308 the current in the partial net graph as if it were a complete graph. This is possible as the sum of the current of all terminals is null thanks to the virtual terminal. The process may then return 310 the current of wire.

Figure 4:
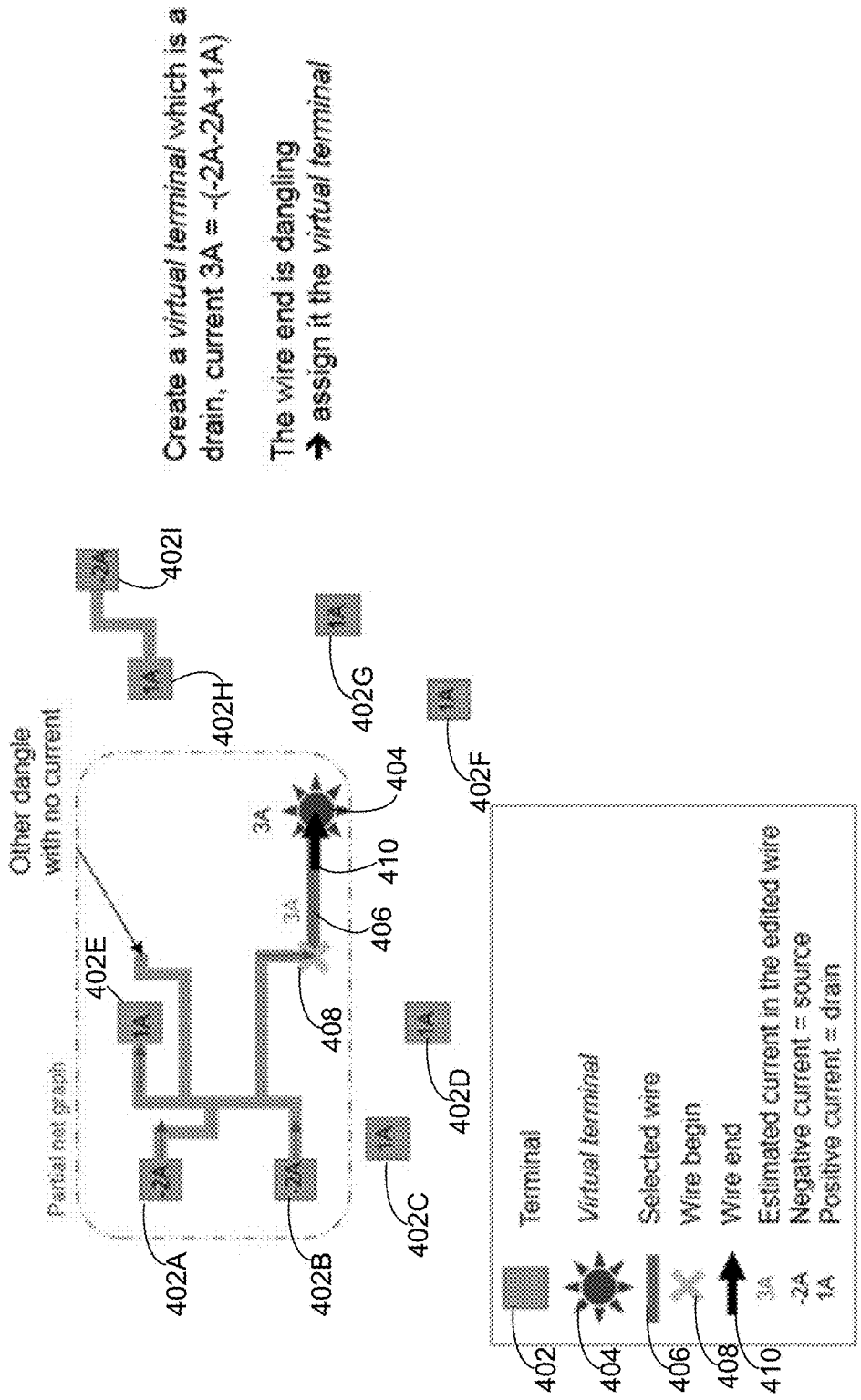
FIG. 4 is an illustration of a schematic of a current estimation process according to an embodiment of the present disclosure.
Figure 5:
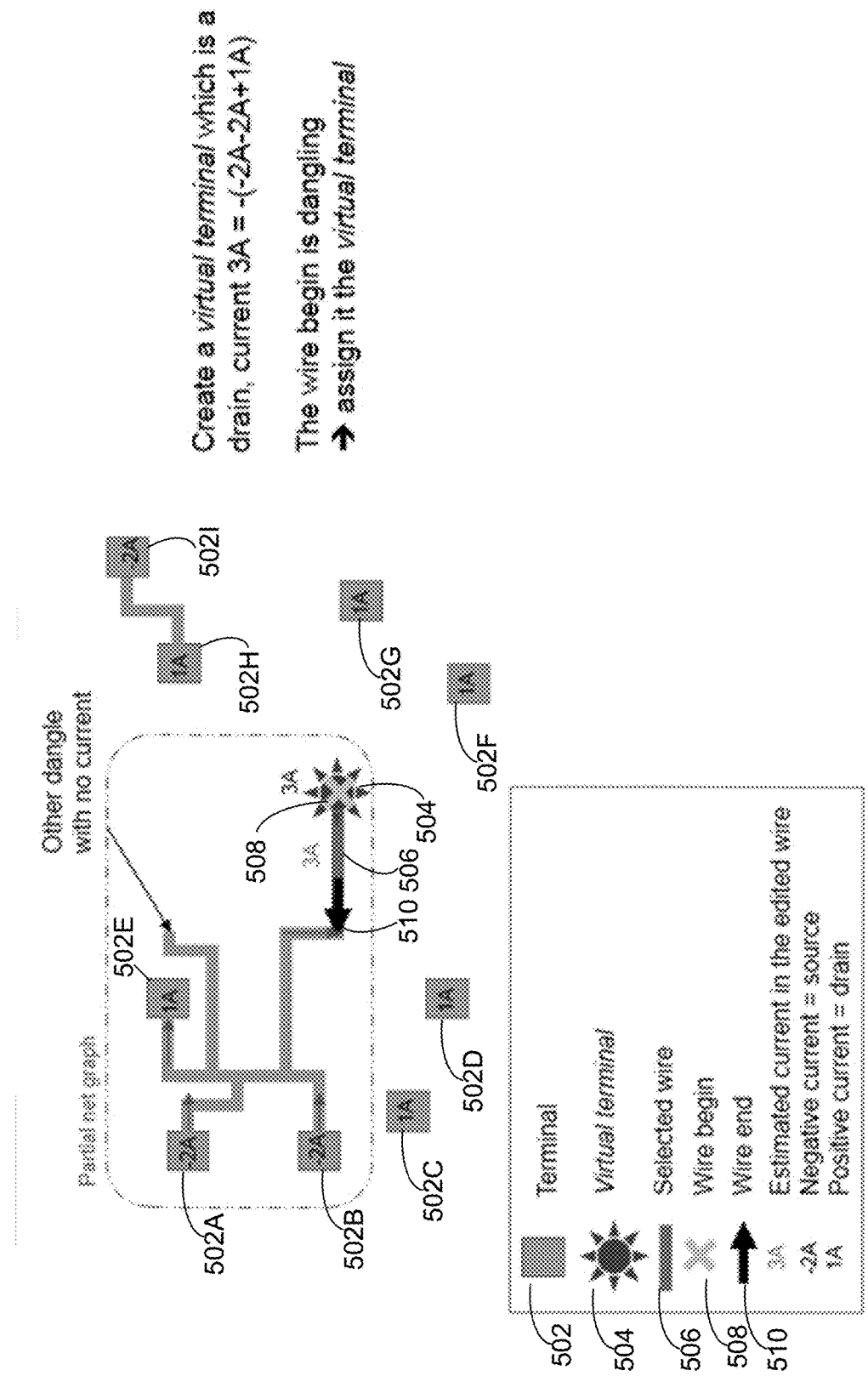
FIG. 5 is an illustration of a schematic of a current estimation process according to an embodiment of the present disclosure.

In some embodiments, and referring now to FIGS. 4-9, embodiments of current estimation process 10 are provided. In some embodiments, the location of the virtual terminal may be either the beginning 408 or the end 410 of wire A. It is very important to not overestimate the wire width. FIGS. 4-9 indicate possible locations of the virtual terminal listed in order of priority. FIG. 4 depicts an example where the wire A end 410 is dangling and FIG. 5 depicts an example where the wire A beginning 508 is dangling. Each of these examples show the creation of a virtual terminal, which is configured as a drain. As shown in the Figures, terminals 402 may be connected via wires and a user may select one of the wires 406 for further analysis. In this way, current estimation process 10 may create virtual terminals 404 at one or more wire ends 410 that are not connected to any other components (e.g., these may be used as future connections to the remaining pins). Accordingly, all of the missing current is going through the last edited wire.

Figure 6:
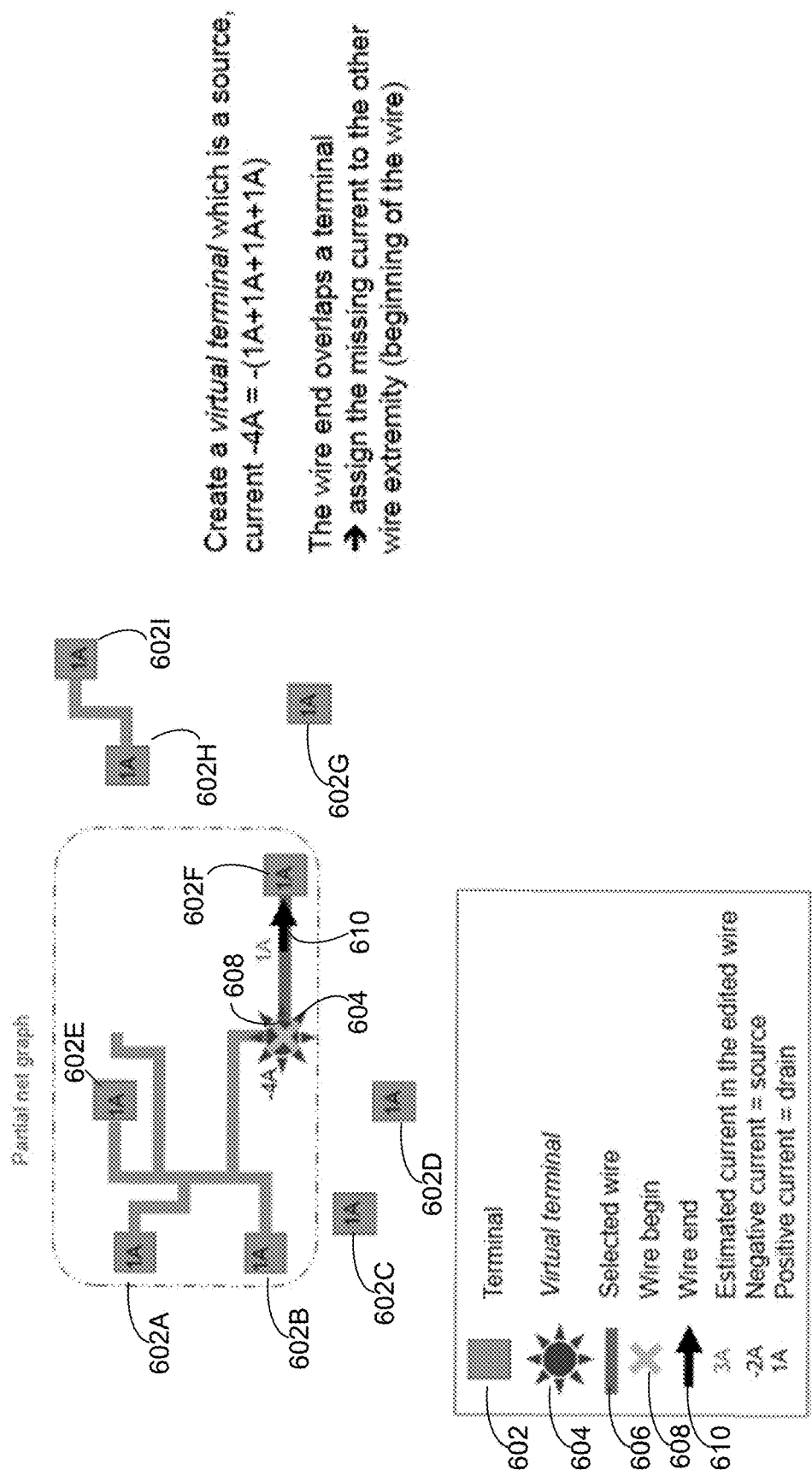
FIG. 6 is an illustration of a schematic of a current estimation process according to an embodiment of the present disclosure.
Figure 7:
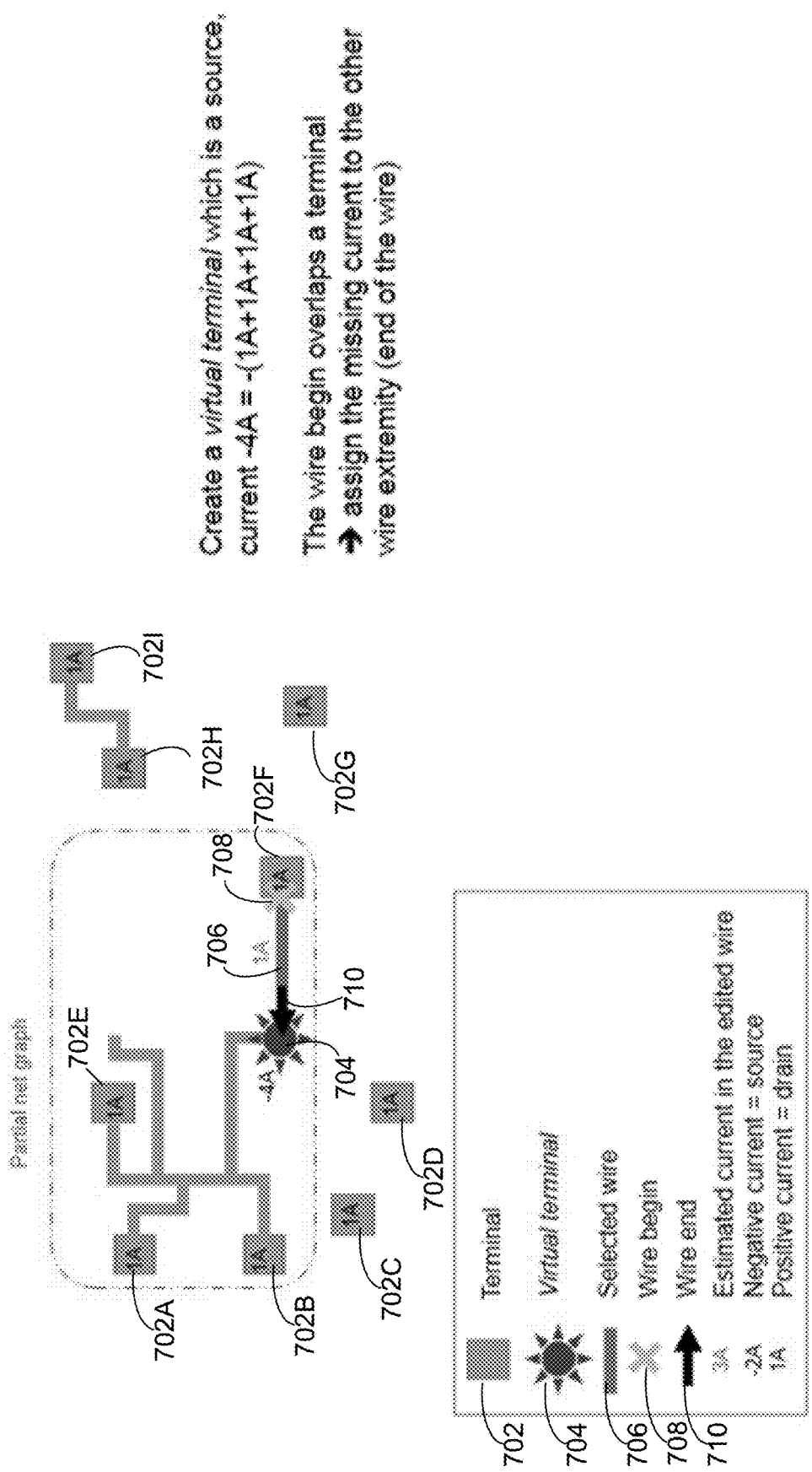
FIG. 7 is an illustration of a schematic of a current estimation process according to an embodiment of the present disclosure.

Referring also to FIGS. 6-7, additional embodiments consistent with current estimation process 10 are provided. These examples depict situations where a wire extremity may overlap a particular terminal and also show the creation of a virtual terminal that may be configured as a source. For example, if one of the extremities of wire A overlaps a terminal, current estimation process may use the other wire extremity for the virtual terminal as shown in the Figures. In other words, when one end of the edited wire is overlapping a terminal, current estimation process 10 may be configured to place the virtual terminal on the other side of the wire. Accordingly, the edited segment may carry only the current of the real terminal. For example, in FIG. 6, virtual terminal 604 is placed on the opposing side of the wire (i.e., wire beginning 608) because of the overlap at terminal 602F.

Figure 8:
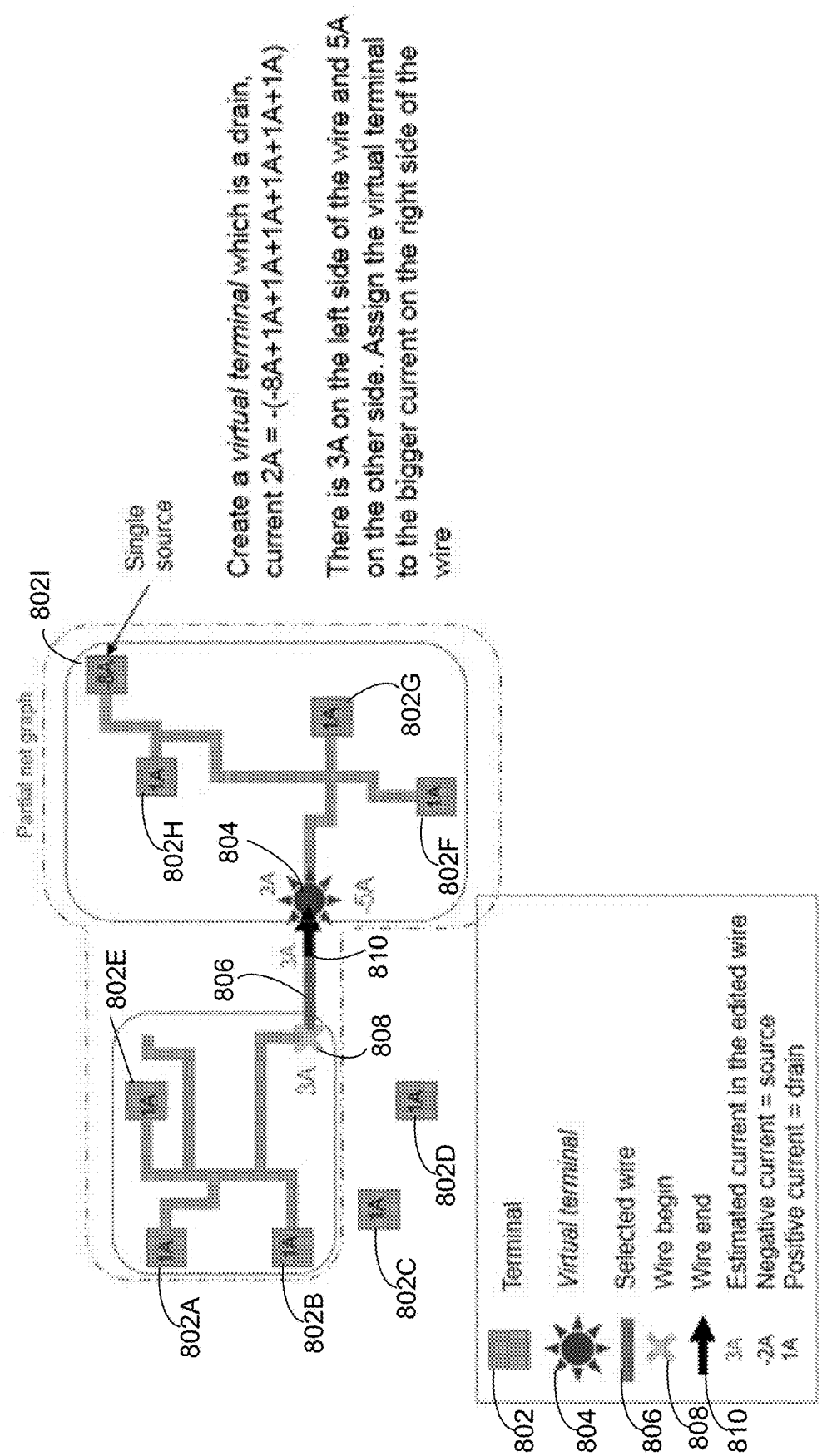
FIG. 8 is an illustration of a schematic of a current estimation process according to an embodiment of the present disclosure.
Figure 9:
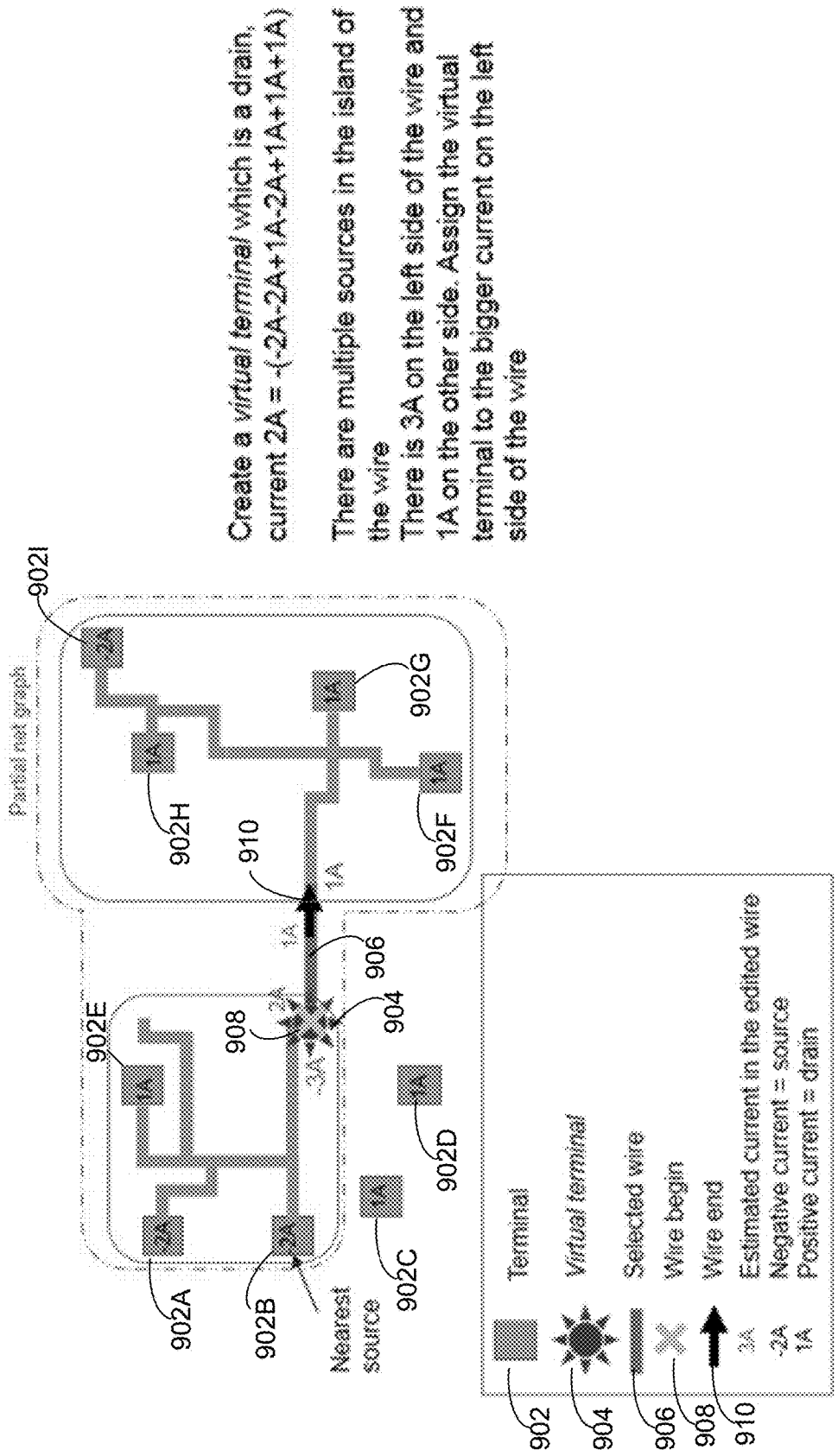
FIG. 9 is an illustration of a schematic of a current estimation process according to an embodiment of the present disclosure.

Referring also to FIGS. 8-9, additional embodiments consistent with current estimation process 10 are provided. These examples depict an example for use in connecting two islands with a single source (see FIG. 8) and multiple sources (see FIG. 9). These examples of current estimation process 10 may create a virtual terminal that is configured as a drain. In some embodiments, the wire may only carry the terminal current. The wire A extremity that is connected to more current. Here, the wire may only carry the smaller current between its two extremities (see, e.g., FIGS. 8-9). Embodiments of current estimation process 10 may be configured to automatically place virtual terminals where there is more current when connecting two groups of wires. In this way, the edited wire may only carry the smallest current between the two groups of wires and is not oversized. Embodiments of current estimation process 10 may be configured to manually place virtual terminals when connecting two groups of wires. In this way, the edited wire may carry either the smallest or biggest current between the two groups of wires according to user choice.

As shown in FIGS. 4-9, embodiments of current estimation process 10 may be configured to allow for the creation of virtual terminals to be able to apply Kirchhoff's law. As opposed to decreasing the current of terminals so that the sum of current for all terminals is equal to zero, current estimation process 10 may allow for the creation of one or several virtual terminals which are assigned the missing current so that it may be possible to apply the Kirchhoff's law to compute the current in the wires that connect the terminals.

In some embodiments, current estimation process 10 may be configured to display the connection points in the design which can accept missing current=virtual terminals. In order to help the user understand where he or she may continue the routing without creating electromigration violations, current estimation process 10 may be configured to display the location of the virtual terminals. The virtual terminals are anchor points to know where the future wire connection may be made.

Figure 10:
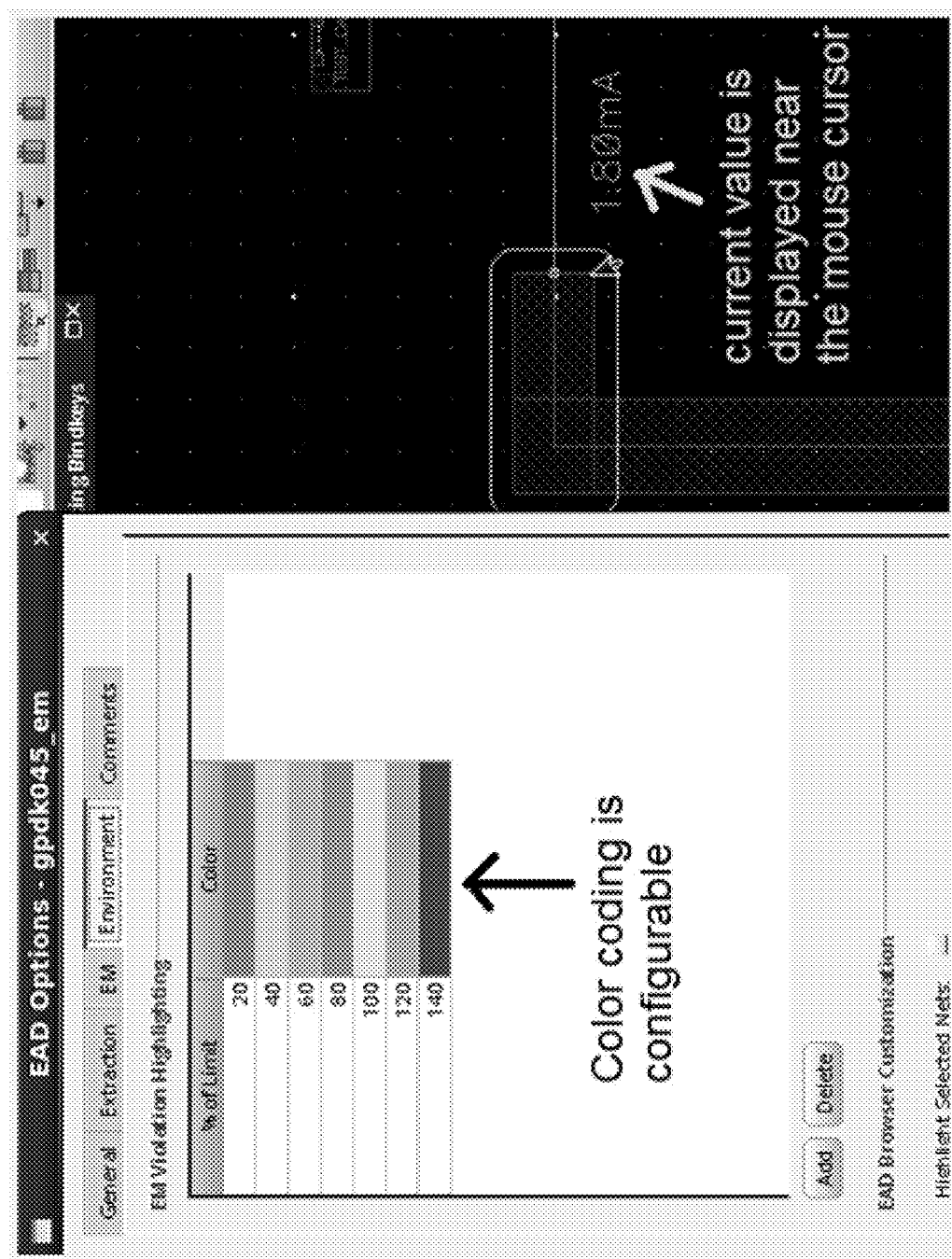
FIG. 10 is an illustration of a graphical user interface of a current estimation process according to an embodiment of the present disclosure.

In some embodiments, current estimation process 10 may be configured to display and color the estimated current to describe if the actual wire width may carry the estimated current or net. In a partially routed design, current estimation process 10 may display the current value for the last edited segment. Current estimation process 10 may also use a configurable color coding to indicate if the actual wire width will match or not. Additionally and/or alternatively, current estimation process 10 may suggest the desired wire width that is supposed to be used to carry the current in the wire (see, e.g., FIG. 10). For example, if the expected width to carry 1 Amp is 10 um, and if the wire width is 5 um, the wire may carry only 0.5 Amp so it may be colored red on graphical user interface 1000 (e.g., by default) because it is two times smaller than expected. If the wire width is 10 um then it may be displayed in green. If the wire width is 20 um then it may be displayed in blue because it is two times larger than expected.

Existing approaches just reduce the source current to get a sum of terminals current equal to zero which leads to underestimating the current in the wires. Or these approaches may just assign the missing current to the wire end (and do not analyze which wire extremity is the best) which also leads to underestimating the current. This may generate random results depending on the direction of the wire.

Embodiments of current estimation process 10 may return more precise and robust (not random) results. Moreover, in the event there is an incorrect estimation current estimation process 10 may overestimate the current in the wire instead of underestimating it. This is preferable to apply design correction interactively while the user is routing a design manually. Overestimating the current will generate fix that create larger wires with less current density errors. This is the opposite if the current is underestimated as the design will be smaller but with more manufacturing/EM errors so it will be more difficult to fix all design errors before sending the design to tapeout.

Embodiments of current estimation process 10 do not require building the entire net graph to get a net topology and satisfy the Kirchhoff's current laws. In contrast, current estimation process 10 may build the graph of the existing topology of a net (this is much easier and faster as it does not require a complex wire planning algorithm).

Additionally and/or alternatively, current estimation process 10 may be configured to overestimate wire current in case of error, as opposed to underestimating the current if the user wants to use this current value to resize the wires and avoid electromigration issues.

Embodiments of current estimation process 10 is fast enough to be used during manual editions to interactively adjust the wire width based on current. As such, it is better than relying on a post process once the net is entirely routed. In this way, obtaining immediate current information while doing manual editing is preferable to waiting for having finish the entire routing of a net to be aware of electromigration and current density problems. Accordingly, current estimation process 10 may help the designer converge faster to an error free design.

In some embodiments, current estimation process 10 may also be configured to allow for the generation of virtual node manually. Accordingly, the process may allow the user to create virtual terminals, select their location and assign current to them. Accordingly, the user may have a better control of the tool that will compute the currents in the already routed part of the design. Manually creating the virtual terminals may allow the user to specify where he or she will connect the remaining real terminals and the tool won't make mistakes when computing the current in the existing wires.

It will be apparent to those skilled in the art that various modifications and variations can be made in the current estimation scheme and debugging process of embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method for use with an electronic design comprising:
   receiving, using a processor, the electronic design;
   identifying a partially routed net associated with the electronic design;
   generating a net graph for the partially routed net;
   selecting a wire associated with the partially routed net at a graphical user interface;
   comparing a proposed current with a wire width associated with the selected wire;
   determining a missing current needed to satisfy Kirchhoff's Current Law ("KCL") along a portion of the wire; and
   generating, at the graphical user interface, a virtual terminal attached to the selected wire, wherein the virtual terminal is assigned the missing current.

2. The computer-implemented method of claim 1, further comprising:
   propagating the missing current in the net graph for one or more fully routed nets associated with the electronic design.

3. The computer-implemented method of claim 2, further comprising:
   returning the current of the selected wire.

4. The computer-implemented method of claim 1, further comprising:
   displaying at least one connection point in the electronic design that can accept the missing current.

5. The computer-implemented method of claim 1, further comprising:
   associating, at a graphical user interface, a color with a portion of the electronic design, based upon, at least in part, the comparison.

6. The computer-implemented method of claim 1, wherein generating the virtual terminal is performed automatically.

7. The computer-implemented method of claim 1, further comprising:
   allowing a user to manually generate the virtual terminal.

8. A computer-readable storage medium having stored thereon instructions, which when executed by a processor result in the following operations:
   receiving, using a processor, the electronic design;
   identifying a partially routed net associated with the electronic design;
   generating a net graph for the partially routed net;
   selecting a wire associated with the partially routed net at a graphical user interface;
   comparing a proposed current with a wire width associated with the selected wire;
   determining a missing current needed to satisfy Kirchhoff's Current Law ("KCL") along a portion of the wire; and
   generating, at the graphical user interface, a virtual terminal attached to the selected wire, wherein the virtual terminal is assigned the missing current.

9. The computer-readable storage medium of claim 8, further comprising:
   propagating the missing current in the net graph for one or more fully routed nets associated with the electronic design.

10. The computer-readable storage medium of claim 9, further comprising:
    returning the current of the selected wire.

11. The computer-readable storage medium of claim 8, further comprising:
    displaying at least one connection point in the electronic design that can accept the missing current.

12. The computer-readable storage medium of claim 8, further comprising:
    associating, at a graphical user interface, a color with a portion of the electronic design, based upon, at least in part, the comparison.

13. The computer-readable storage medium of claim 8, wherein generating the virtual terminal is performed automatically.

14. The computer-readable storage medium of claim 8, further comprising:
    allowing a user to manually generate the virtual terminal.

15. A computing system for use in an electronic circuit design comprising:
    at least one processor configured to receive the electronic design and identify a partially routed net associated with the electronic design, the at least one processor further configured to generate a net graph for the partially routed net and to select a wire associated with the partially routed net at a graphical user interface, the at least one processor further configured to compare a proposed current with a wire width associated with the selected wire, the at least one processor further configured to determine a missing current needed to satisfy Kirchhoff's Current Law ("KCL") along a portion of the wire, the at least one processor further configured to generate, at the graphical user interface, a virtual terminal attached to the selected wire, wherein the virtual terminal is assigned the missing current.

16. The system of claim 15, wherein the at least one processor is further configured to propagate the missing current in the net graph for one or more fully routed nets associated with the electronic design.

17. The system of claim 16, wherein the at least one processor is further configured to return the current of the selected wire.

18. The system of claim 15, wherein the at least one processor is further configured to display at least one connection point in the electronic design that can accept the missing current.

19. The system of claim 15, wherein the at least one processor is further configured to associate, at a graphical user interface, a color with a portion of the electronic design, based upon, at least in part, the comparison.

20. The system of claim 15, wherein generating the virtual terminal is performed automatically.

* * * * *